United States Patent
Matsumoto

(10) Patent No.: US 8,238,206 B2
(45) Date of Patent: Aug. 7, 2012

(54) OPTICAL DISK DEVICE

(75) Inventor: Masaki Matsumoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 135 days.

(21) Appl. No.: 12/817,673

(22) Filed: Jun. 17, 2010

(65) Prior Publication Data
US 2010/0322046 A1 Dec. 23, 2010

(30) Foreign Application Priority Data

Jun. 19, 2009 (JP) ................................. 2009-146404

(51) Int. Cl.
*G11B 7/00* (2006.01)
(52) U.S. Cl. ................ 369/44.36; 369/44.29; 369/53.28
(58) Field of Classification Search ............... 369/44.25, 369/44.29, 44.34, 44.36, 47.25, 53.23, 53.28, 369/44.35, 124.1
See application file for complete search history.

(56) References Cited

U.S. PATENT DOCUMENTS

| | | | | |
|---|---|---|---|---|
| 6,134,198 A * | 10/2000 | Yamamoto et al. | ........ | 369/44.35 |
| 6,434,096 B1 * | 8/2002 | Akagi et al. | ............... | 369/44.32 |
| 6,778,473 B1 * | 8/2004 | Tomita et al. | ............... | 369/44.26 |
| 2002/0036967 A1 * | 3/2002 | Osada | ........................ | 369/53.28 |
| 2003/0133374 A1 * | 7/2003 | Murata et al. | ............... | 369/44.35 |
| 2003/0151987 A1 * | 8/2003 | Watanabe et al. | .......... | 369/44.26 |
| 2004/0013057 A1 * | 1/2004 | Aoe et al. | ................... | 369/44.35 |
| 2004/0085872 A1 * | 5/2004 | Sano et al. | ................. | 369/44.35 |

FOREIGN PATENT DOCUMENTS

JP 2000-11404 1/2000

\* cited by examiner

*Primary Examiner* — Thomas Alunkal
(74) *Attorney, Agent, or Firm* — Morgan, Lewis & Bockius LLP

(57) ABSTRACT

The optical disk device includes a generation means and a LC servo means. The generation means generates a lens error signal based on an electrical signal output from a pickup head. After amplifying the lens error signal with a predetermined gain, the generation means outputs the lens error signal. The LC servo means performs lens center servo control based on the lens error signal. The optical disk device further includes a measurement means which measures, before the lens center servo control, a first and a second amplitude values of the lens error signal. The measurement means calculates a current gain based on the first and second amplitude values, the latest gain which is currently set, and a predetermined target amplitude value. Then the measurement means sets the current gain to the generation means.

4 Claims, 5 Drawing Sheets

OPTICAL DISK DEVICE

CROSS REFERENCE

This Nonprovisional application claims priority under 35 U.S.C. §119(a) on Patent Application No. 2009-146404 filed in Japan on Jun. 19, 2009, the entire contents of which are hereby incorporated by reference.

BACKGROUND OF THE INVENTION

The present invention relates to an optical disk device which performs lens center servo control.

In the prior art, optical disk devices which read and record data from and to optical disks are generally widespread. Such optical disks, for example, may be Blu-Ray disks or DVDs or CDs.

As is well known in the art, the optical disk device performs tracking servo control and focus servo control during reading and recording data from and to an optical disk. The tracking servo control is the control in which the optical disk device adjusts an irradiation position of laser light to a center of tracks on the optical disk. The focus servo control is the control in which the optical disk device adjusts a focused position of the laser light upon a recording surface of the optical disk.

By performing the tracking servo control and the focus servo control, during reading and recording of the optical disk, the optical disk device not only allows the laser light to follow along a target track on the optical disk, but also ensures focusing the laser light upon the target track.

Further, the optical disk device needs to perform a high-speed and stable seek operation during reading and recording of the optical disk. By the seek operation, the optical disk device shifts a reading position or a recording position of the optical disk from the track which is currently tracking to the target track.

In the seek operation and the like, the optical disk device turns off the tracking servo control, and performs lens center servo control (hereinafter termed the "LC servo control") by a lens error signal (hereinafter termed the "LE signal"). The LE signal shows to what extent the current position of an objective lens is away from a central position of the objective lens. The LE signal is generated by using signals output from a plurality of light receiving elements which detects reflected light from the optical disk. By the LC servo control, the optical disk device controls in such a manner that the objective lens maintains a central position corresponding to a standard voltage even if the objective lens swings due to vibration caused by rotation of the optical disk when the tracking servo control is not performed.

Japanese Laid-Open Patent Publication 2000-11404 also discloses a disk drive device which performs the above mentioned LC servo control.

However, regarding the optical disk set in the optical disk device, each optical disk has a different reflectance. In addition, regarding the characteristics of a pickup head provided in the optical disk device, each pickup head has an individual difference. Therefore, a voltage level of the LE signal generated based upon an output of the pickup head is different in each optical disk or in each pickup head.

Moreover, when an unbalanced disk is set in the optical disk device, the objective lens swings heavily due to vibration caused by rotation of the optical disk, thereby causing the objective lens to be considerably away from the above mentioned central position.

Thus, in a case where the level of the generated LE signal is too strong or too weak, the optical disk devices according to the prior art have a problem of failing to perform the proper LC servo control based upon the LE signal when the tracking servo control is turned off. Consequently, when shifting the tracking servo control from a turning off situation to a turning on situation (for example, when the above mentioned seek operation is finished), the optical disk devices according to the prior art have a problem of failing to perform the tracking servo control. Accordingly, with the optical disk devices according to the prior art, reading or recording of the unbalanced optical disk is often interrupted before its completion.

The objective of the present invention is to provide an optical disk device which can widen the capacity of a swinging amount of the objective lens due to rotation of the unbalanced optical disk, and which can dramatically reduce the interruption of the reading or recording of the optical disk before its completion.

SUMMARY OF THE INVENTION

The optical disk device according to the present invention includes a pickup head and a generation means. The pickup head irradiates an optical disk with laser light via an objective lens, and outputs an electrical signal based on the light reflected from the optical disk. The generation means generates a lens error signal based on the electrical signal output from the pickup head. Then, after amplifying the lens error signal with a gain which is set in advance, the generation means outputs the lens error signal.

The optical disk device further includes a shifting means and a LC servo means. The shifting means shifts the objective lens in the radial direction of the optical disk. The LC servo means performs lens center servo control based on the lens error signal output from the generation means.

Moreover, the optical disk device further includes a measurement means. Before the lens center servo control, the optical disk device measures a first amplitude value of the lens error signal output from the generation means by applying to the shifting means a positive predetermined level of driving voltage. Then, the optical disk device measures a second amplitude value of the lens error signal output from the generation means by applying to the shifting means a negative predetermined level of driving voltage.

In addition, the measurement means calculates a current gain based on the first and second amplitude values, the latest gain which is currently set, and a predetermined target amplitude value. Then the measurement means sets the current gain to the generation means. After amplifying the generated lens error signal with the current gain, the generation means outputs the generated lens error signal.

The LC servo means performs the lens center servo control, based on the lens error signal which has been amplified with the current gain.

With the structure described above, the measurement means sets the gain of the generation means, depending on the voltage level of the lens error signal generated from the optical disk currently set in the optical disk device. The LC servo means performs the lens center servo control with this gain.

DETAILED DESCRIPTION OF THE INVENTION

The optical disk device according to an embodiment of the present invention will now be described below.

Figure 1:
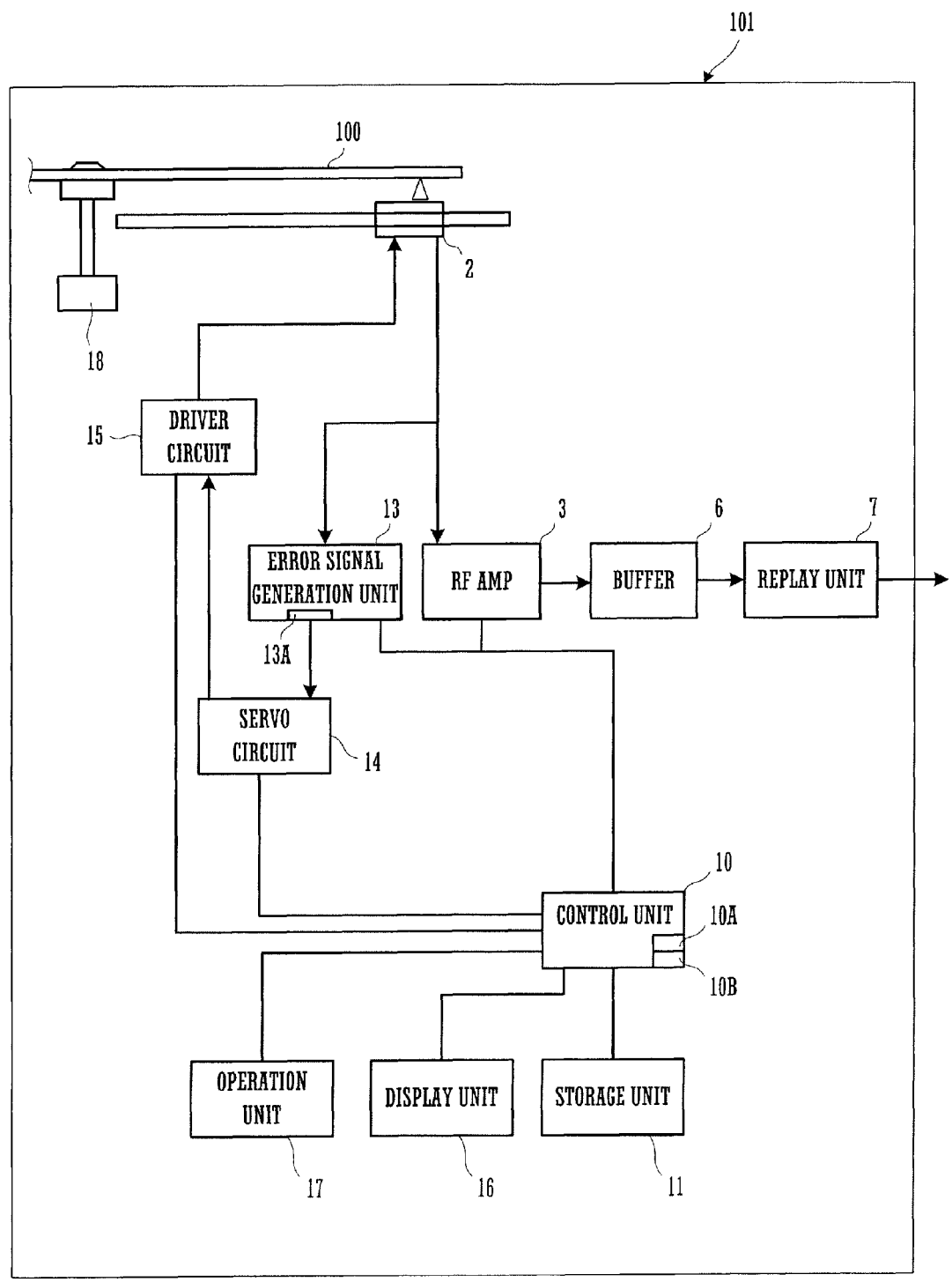
FIG. 1 is a block diagram showing the structure of the main portion of an optical disk device 101 which is an embodiment of the present invention.
Figure 2:
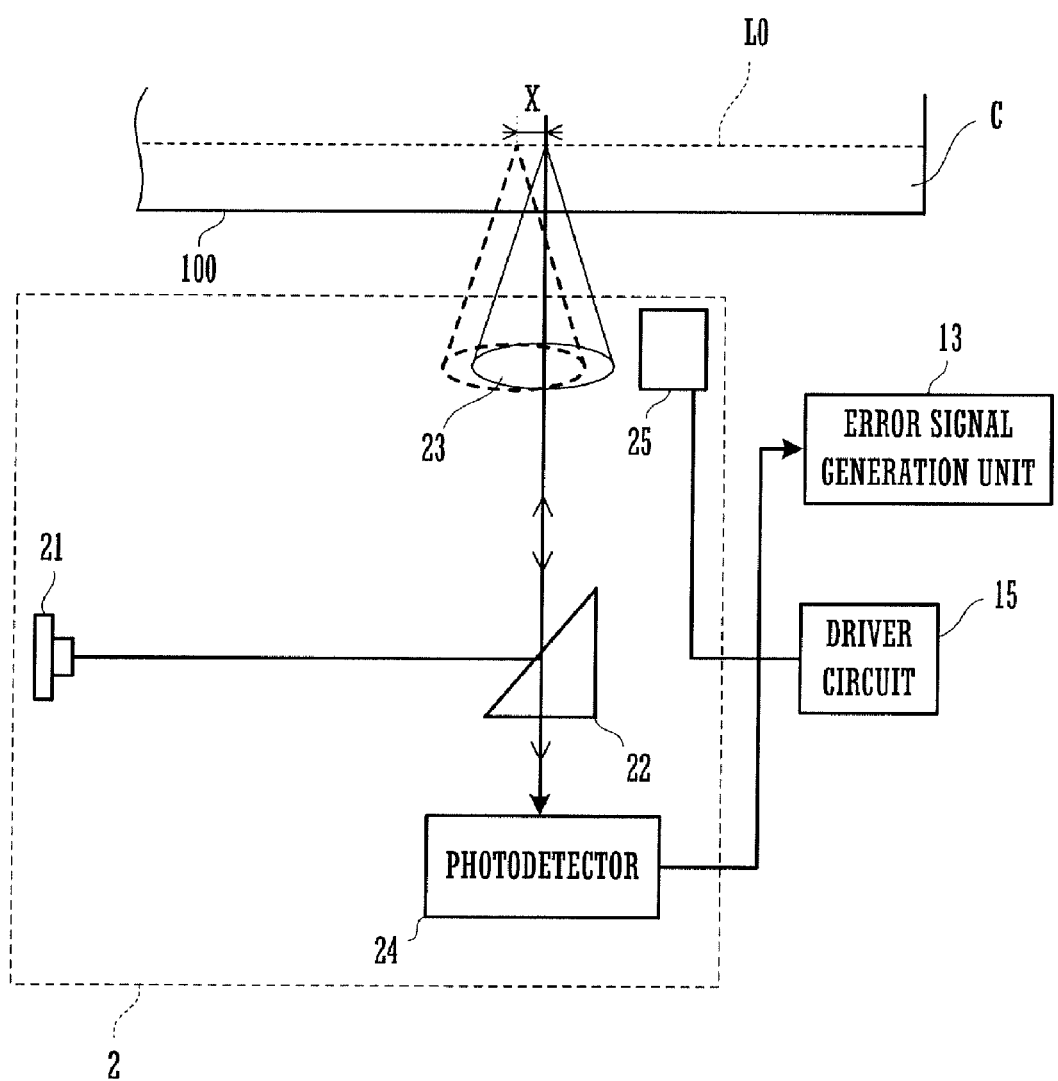
FIG. 2 is a block diagram showing the internal structure of a pickup head 2 shown in FIG. 1.

FIG. 1 is a block diagram showing the structure of the main portion of an optical disk device 101 which is an embodiment of the present invention. FIG. 2 is a block diagram showing the internal structure of a pickup head 2 shown in FIG. 1. The optical disk device 101 comprises a spindle motor 18, a pickup head 2, an error signal generation unit 13, a servo circuit 14 and a driver circuit 15. The optical disk device 101 further comprises a control unit 10, an RF amp 3, a buffer RAM 6, a replay unit 7, an operation unit 17 and a display unit 16.

The optical disk device 101 is a so-called Blu-Ray player. An optical disk 100 is, for example, a Blu-Ray disk or a DVD (Digital Versatile Disk).

It should be understood that, while the use of a Blu-Ray player for replay only is explained in this embodiment, in an actual implementation, this may be a recordable Blu-Ray recorder.

In the optical disk 100 are formed a data recording layer LO for recording data such as image data and audio data, and a transparent cover layer C for protecting the data-recordable layer LO. Below the cover layer C is provided the pickup head 2. The pickup head 2 moves in a radial direction of the optical disk 100 by the rotation of a thread motor (not shown in the figures).

The internal structure of the pickup head 2 will be explained using FIG. 2.

The pickup head 2 comprises a laser diode (LD) 21, a collimator lens (not shown in the figures), a beam splitter 22, an objective lens 23, a photodetector 24, a thread transfer mechanism (not shown in the figures) comprising the thread motor, a lens holder (not shown in the figures), and an actuator 25. In a similar manner to the case with a per se known optical disk device, the pickup head 2 is fitted to an axis which extends along the radial direction of the optical disk 100, so as to shift freely along the axis (see FIG. 1).

The LD 21 is a light source which outputs laser light. The objective lens 23 is fixed to a central portion of the lens holder. The objective lens 23 adjusts the position upon the optical disk 100 at which the laser light is irradiated. Moreover, a movable portion of the actuator 25 comprises a focus coil and a tracking coil which are respectively coiled around the lens holder, none of which are shown in the figures. The actuator 25 shifts the objective lens 23 in the direction towards and away from the optical disk 100 when a driving current is supplied to the focus coil. Furthermore, the actuator 25 shifts the objective lens 23 in the radial direction of the optical disk 100 when a driving current is supplied to the tracking coil.

The laser light output from the LD 21 is reflected by the beam splitter 22. The reflected laser light passes through the objective lens 23, and is irradiated onto the data recording layer LO. The light reflected by the data recording layer LO passes through the objective lens 23 and the beam splitter 22, and then is received by the photodetector 24.

Figure 3:
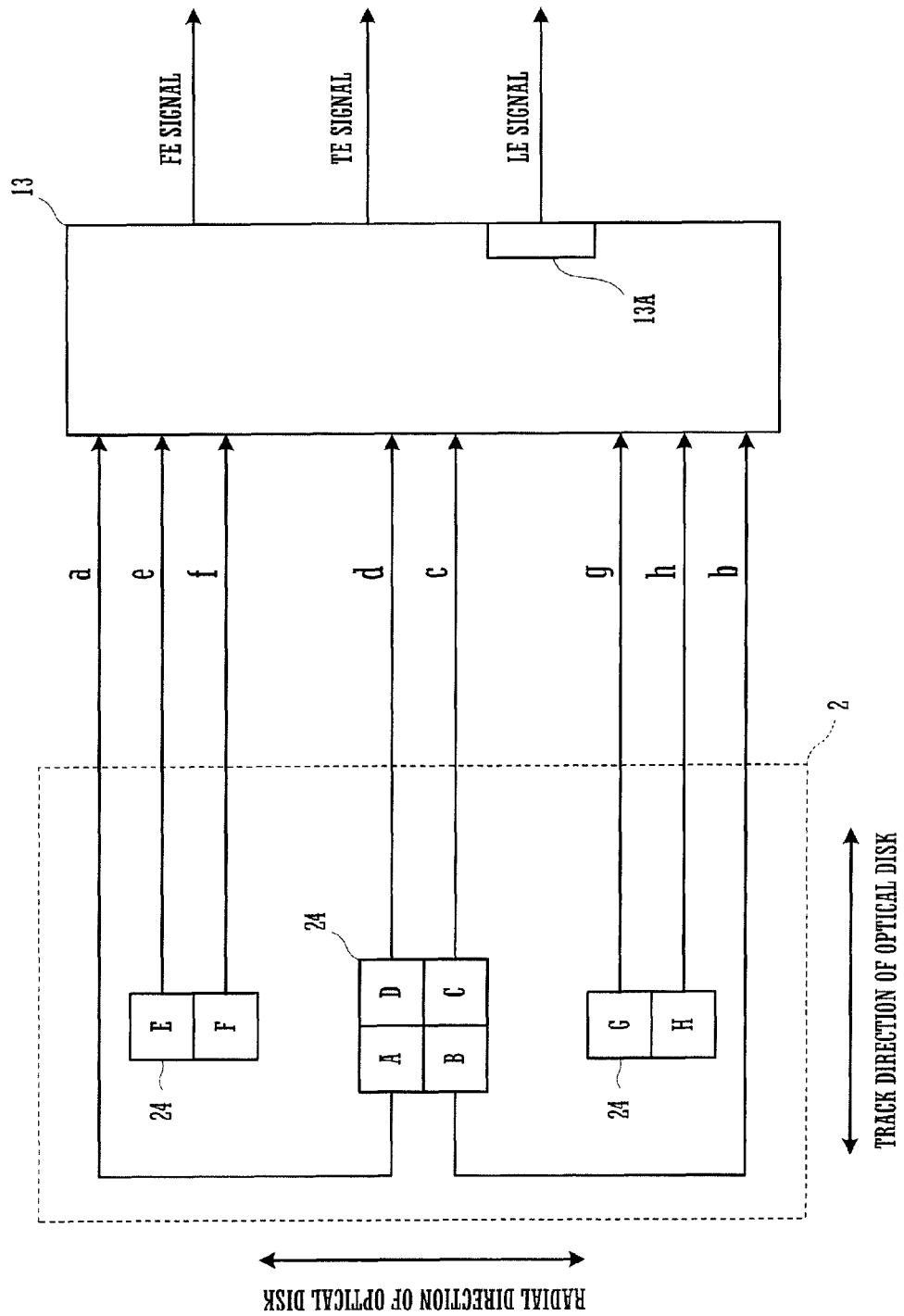
FIG. 3 shows an example of arrangement of light receiving areas A-H provided in a photodetector 24.

FIG. 3 shows an example of arrangement of light receiving areas A-H provided in a photodetector 24. The photodetector 24 has a plurality of light receiving areas A-H. The photodetector detects reflected light from the optical disk 100 by the plurality of light receiving areas A-H. The photodetector 24 supplies to the error signal generation unit 13, detected signals a-d which are detected by the light reception areas A-D, and detected signals e-h which are detected by the light reception areas E-H. The photodetector 24 further supplies to the RF amp 3 the detected signals a-d.

When tracking servo control is performed, the error signal generation unit 13 generates a tracking error signal (hereinafter termed the "TE signal") based on an electrical signal output from the pickup head 2. After amplifying the TE signal, the generation unit 13 outputs the TE signal to the servo circuit 14.

Moreover, when the tracking servo control is not performed, the error signal generation unit 13 generates a lens error signal (hereinafter termed the "LE" signal) based on the electrical signal output from the pickup head 2. After amplifying the LE signal with an amplifier 13A, the error signal generation unit 13 outputs the LE signal to the servo circuit 14. The gain of the amplifier 13A is set by the control unit 10, and is thereby always updated to the latest value.

Further, the error signal generation unit 13 generates a focus error signal (hereinafter termed the "FE signal") based on the electrical signal output from the pickup head 2. After amplifying the FE signal with the amplifier 13A, the error signal generation unit 13 outputs the FE signal to the servo circuit 14.

The TE signal shows to what extent an irradiation position of the laser light is away from the center of a track of the optical disk 100. The TE signal is calculated by a well-known DPP (Differential Push Pull) method based on the following expression 1.

$$TE = \{(a+d)-(b+c)\}+\{(e-f)+(g-h)\} \quad \text{Expression 1}$$

Next, the LE signal shows to what extent the objective lens is away from a central position thereof. The LE signal is calculated based on the following expression 2. The central position of the objective lens 23 means the position of the movable portion of the actuator 25 when the actuator 25 does not shift the objective lens 23. Namely, the central position is the position of the movable portion of the actuator 25 which is in a natural state without external force.

$$LE = \{(a+d)-(b+c)\}-\{(e-f)+(g-h)\} \quad \text{Expression 2}$$

Next, the FE signal shows to what extent a focused position of the laser light is away from a recording surface of the optical disk 100. The FE signal is calculated by a well-known astigmatic method based on the following expression 3.

$$FE = (a+c)-(b+d) \quad \text{Expression 3}$$

The RF signal generated by the RF amp 3 shows the information such as audio information and sound information which is recorded on the data recording layer LO of the optical disk 100. The RF signal is calculated based on the following expression 4.

$$RF = a+b+c+d \quad \text{Expression 4}$$

The servo circuit 14 generates, based upon the FE signal output from the error signal generation unit 13, a focusing drive signal for making the value of the FE signal equal to zero (a standard level), and outputs the focusing drive signal to the driver circuit 15. Moreover, when the tracking servo control is performed, the servo circuit 14 generates, based upon the TE signal output from the error signal generation unit 13, a tracking drive signal for making the value of the TE signal equal to zero (a standard level), and outputs the tracking drive signal to the driver circuit 15. Further, when the tracking servo control is not performed, the servo circuit 14 generates an LE drive signal for making the value of the LE signal equal to zero (a standard level), and outputs the LE drive signal to the driver circuit 15.

The driver circuit 15 supplies the tracking drive signal to the actuator 25 provided in the pickup head 2, shifts the objective lens 23 of the pickup head 2 in the radial direction of the optical disk 100, and thereby performs tracking servo control for irradiating the laser light along the center of the track of the optical disk 100. Moreover, the driver circuit 15 supplies the focusing drive signal to the actuator 25, shifts the objective lens 23 of the pickup head 2 along the direction of the optical axis with respect to the optical disk 100, and thereby performs focus servo control for focusing the laser light upon the recording surface of the optical disk 100. Further, when the tracking servo control is not performed, the driver circuit 15 supplies the LE drive signal to the actuator 25, and performs LC servo control for maintaining a central position of the objective lens 23. In the central position, the objective lens 23 of the pickup head 2 corresponds to a standard voltage.

Accordingly, when the tracking servo control is turned on, the optical disk device 101 performs the tracking servo control and the focus servo control, thereby during reading or recording of the optical disk 100, not only allowing the laser light to follow along a target track on the optical disk 100, but also ensuring focusing the laser light upon the track. Moreover, by the LC servo control, the optical disk device 101 controls in such a manner that the objective lens maintains a central position corresponding to the standard voltage even if the objective lens 23 swings due to vibration caused by rotation of the optical disk 100 when the tracking servo control is turned off.

Next, the configuration of the optical disk device 101 during replay will be explained.

The pickup head 2 irradiates laser light of read power upon the optical disk 100. Then the pickup head 2 detects the reflected light from the optical disk 100 with the photodetector 24. Thus, the optical disk device 101 optically reads out the data recorded upon the optical disk 100.

The RF amp 3 generates an RF signal based on the reflected light from the optical disk 100. The reflected light is detected by the plurality of light reception areas A-D included in the photodetector 24 provided in the pickup head 2. Then the RF amp 3 amplifies the RF signal, processes it, and extracts video and audio data therefrom. The data which is extracted here may be, for example, encoded according to MPEG. Finally, the RF amp 3 sequentially stores the extracted video and audio data in the buffer RAM 6.

The replay unit 7 includes a decoder (not shown in the figures) which sequentially reads out and decodes the data stored in the buffer RAM 6. A liquid crystal monitor and a speaker may be, for example, connected to the optical disk device 101. The replay unit 7 generates a replay signal from the data decoded by the decoder, and outputs the replay signal to the liquid crystal monitor and the speaker or the like. Due to this, the user is able to view the contents stored in the optical disk 100 via the liquid crystal monitor and the speaker or the like.

The storage unit 11 may, for example, consist of a EEPROM. The storage unit 11 stores a control program which describes a control method for controlling the operation of various sections of the optical disk device 101.

The control unit 10 may, for example, consist of a microcomputer. The control unit 10 includes a RAM 10A and a timer circuit 10B. The RAM 10A serves as a working space for keeping data processed by the control program described above. The timer circuit 10B counts the time. The details of the timer circuit 10B will be described hereinafter.

The operation unit 17 is provided with a plurality of keys for receiving input operation from the user. The operation unit transmits to the control unit 10 a signal (command), according to the key operated by the user.

The display unit 16 is, for example, constituted by a LCD (Liquid Crystal Display). The display unit 16 displays the time, information which specifies the operational state of the optical disk device 101, information related to the data which is being replayed, messages to the user, and the like.

The error signal generation unit 13 corresponds to the "generation means" of the claims. The actuator 25 corresponds to the "shifting means" of the claims. The servo circuit 14 and the driver circuit 15 correspond to the "LC servo means" of the claims. Moreover, the servo circuit 14 and the driver circuit 15 correspond to the "tracking servo means" of the claims. The control unit 10 corresponds to the "measurement means" of the claims.

Figure 4:
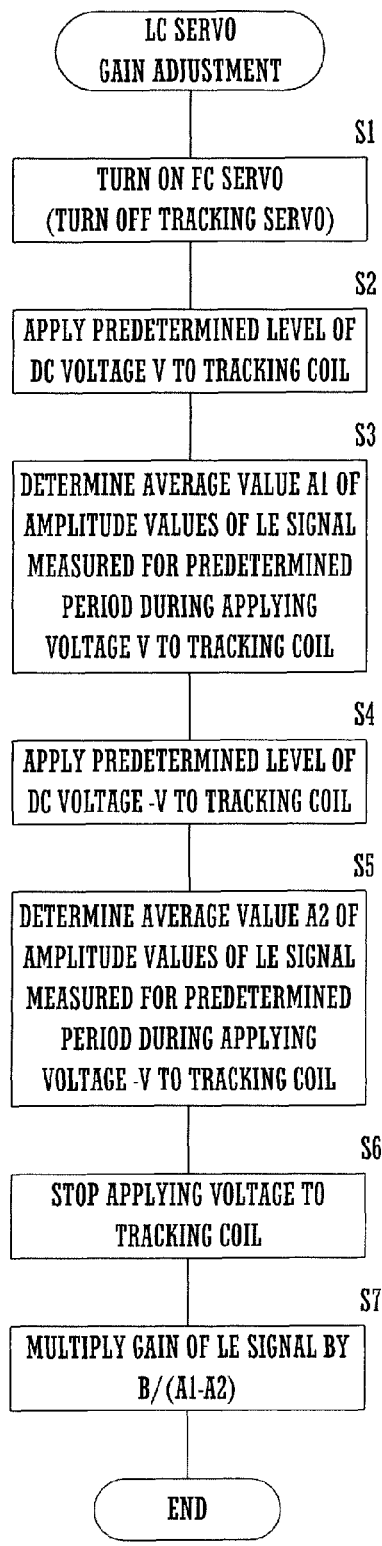
FIG. 4 is a flow chart showing the initial operation performed by a control unit 10 provided in the optical disk device 101 according to an embodiment of the present invention.

FIG. 4 is a flow chart showing the initial operation performed by the control unit 10 of the optical disk device 101 according to an embodiment of the present invention. When the user sets the optical disk 100 in the optical disk device 101, it is highly likely that the optical disk 100 is different from the optical disk which was previously set in the optical disk device 101. Namely, it is much more likely that the user sets in the optical disk device 101, the optical disk 100 which differs in reflectance from the optical disk which was previously set in the optical disk device 101. Moreover, the characteristics of the pickup head 2 are susceptible to changes in temperature around the pickup head 2, when the user replays the optical disk 100. Accordingly, as shown in FIG. 4, when the user sets the optical disk 100 in the optical disk device 101, or when the user turns on the optical disk device 101 in which the optical disk 100 is previously set, the control unit 10 adjusts the gain of the amplifier 13A provided in the error signal generation unit 13.

First, the control unit 10 instructs the servo circuit 14 to turn on the focus servo control and to turn off the tracking servo control (step S1).

Next, the control unit 10 causes the driver circuit 15 to apply a positive predetermined level of DC voltage V to the tracking coil of the actuator 25 (step S2). Due to this, the objective lens 23 is displaced, for example, from the central position thereof by a predetermined distance X (see FIG. 2).

Then the control unit 10 measures, for a predetermined period, amplitude values of the LE signal during applying the DC voltage V to the tracking coil, thereby determining an average value A1 of the amplitude values of the predetermined period (step S3). The control unit 10 measures the predetermined period (for example, one second) by a timer circuit 10B.

Likewise, the control unit 10 causes the driver circuit 15 to apply a negative predetermined level of DC voltage −V to the tracking coil of the actuator 25 (step S4). Due to this, the objective lens 23 is displaced, for example, from the central position thereof by a predetermined distance −X (namely, in a reverse direction of X). The predetermined distance X mentioned above is the maximum of a range in which the LC servo control for maintaining the central position "0" is performed. And the predetermined distance −X is the minimum of a range in which the LC servo control for maintaining the central position "0" is performed.

Then the control unit 10 measures, for a predetermined period, amplitude values of the LE signal during applying the DC voltage −V to the tracking coil, thereby determining an average value A2 of the amplitude values of the predetermined period (step S5).

The control unit 10 stops applying the voltage to the tracking coil of the actuator 25 (step S6).

The control unit 10 calculates gain Q which is to be set, based on the average values A1 and A2 of the amplitude values, gain P which was previously set and a target amplitude value B which is determined in advance. Then, the control unit 10 sets the calculated gain Q to the amplifier 13A (step S7). Specifically, the control unit 10 calculates the gain Q by using the following expression: $Q=P \times B/(A1-A2)$. For instance, when B is 100 mV, A1 is 35 mV, and A2 is −35 mV, the control unit 10 multiplies the gain P by about 1.4.

When the user sets a balanced optical disk in the optical disk device 101, the control unit 10 beforehand sets the target amplitude value B to the optimum amplitude value of the LE signal for the LC servo control. The control unit 10 stores the target amplitude value B in the storage unit 11 in advance. For instance, when the user sets the balanced optical disk in the optical disk device 101, the control unit 10 previously sets the target amplitude value B to the value obtained by subtracting a value B1 from a value B2. The value B1 is the average value of amplitude values of the LE signal generated during applying the DC voltage −V. The value B2 is the average value of amplitude values of the LE signal generated during applying the DC voltage V.

After step S7, the control unit 10 terminates this routine. Then, for example during a seek operation shown in FIG. 5 to be hereinafter described, the control unit 10 performs the LC servo control by using the gain Q which was set at step S7. By the seek operation, the optical disk device 101 shifts a reading position of the optical disk from the track which is currently tracking to the target track.

Even if ordinary tracking servo control except the seek operation, the control unit 10 performs the LC servo control by using the gain Q which was set at step S7.

Figure 5:
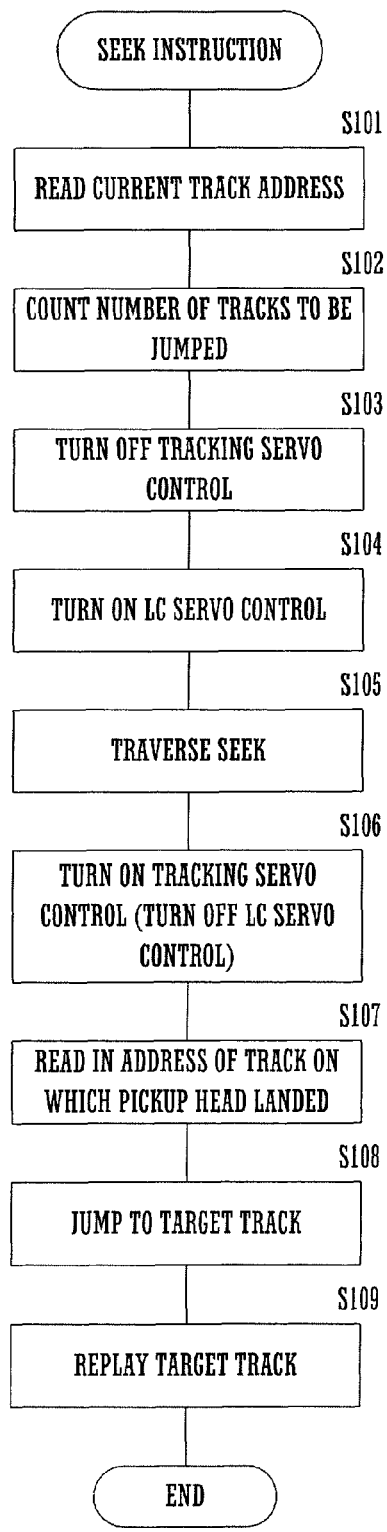
FIG. 5 is a flow chart showing the operation performed during a seek operation by the control unit 10 provided in the optical disk device 101 according to an embodiment of the present invention.

FIG. 5 is a flow chart showing the operation performed during the seek operation by the control unit 10 provided in the optical disk device 101 according to an embodiment of the present invention. This operation is performed when the user instructs the optical disk device to perform the seek operation. When the user instructs the optical disk device to perform the seek operation means, for example, when the user instructs the optical disk device to perform time search replay. In the time search replay, the user designates a replay elapsed time, e.g., a target time (hour, minute, second) with the operation unit 17. Thus, an address of a target track determines. The seek operation includes a traverse seek (e.g., a long seek), and a track jump (e.g., a short seek for fine adjustment). The traverse seek is the seek in which the optical disk device 101 turns off the tracking servo control, and then shifts the objective lens 23 at high speed via the thread transfer mechanism. The track jump is the seek in which the optical disk device 101 turns on the tracking servo control, and then controls speed while counting the number of track zero cross signals obtained by binarizing the TE signal via a comparator.

In the seek operation described above, the control unit 10 reads in the address of the track which is currently tracking when the tracking servo control is performed (step S101).

Then, the control unit 10 counts the number of tracks to be jumped, based on the address of the track which is currently tracking and the address of the target track (step S102).

When there are many tracks to be jumped, the control unit 10 turns off the tracking servo control (step S103) and turns on the LC servo control (step S104).

The control unit 10 performs the traverse seek described above when the tracking servo control is not performed (step S105). Specifically, when the tracking servo control is not performed, the control unit 10 shifts the pickup head 2 at high speed via the thread transfer mechanism, and then stops the thread transfer mechanism before the target track (step S105).

Next, the control unit 10 turns off the LC servo control, and then turns on the tracking servo control (step S106). And, the control unit 10 reads in the address of the track on which the pickup head 2 landed (step S107). Then the control unit 10 performs the track jump described above (step S108).

By performing this seek operation (e.g., steps S103-S108), the optical disk device 101 shifts the reading position of the optical disk from the track which is currently tracking to the target track.

Then, the control unit 10 instructs the pickup head 2 to start reading data from the target track (step S109). Thus, audio/visual data recorded on the target track is replayed.

With the structure described above, the control unit 10 sets the gain of the amplifier 13A, depending on the level of the LE signal generated from the optical disk 100 set in the optical disk device 101. Namely, the gain Q currently set in the amplifier 13A is obtained, depending on the reflectance of the optical disk 100 currently set in the optical disk device 101, and the characteristics of the pickup head 2.

Accordingly, even if the optical disk 100 set in the optical disk device 101 is the unbalanced disk, the gain Q is obtained depending on the reflectance of the optical disk 100, and the characteristics of the pickup head 2. Thus, even if the optical disk 100 set in the optical disk device 101 is the unbalanced disk, it is highly possible that the optical disk device 101 properly performs the LC servo control based on the LE signal. Namely, the optical disk device 101 can widen the capacity of a swinging amount of the objective lens 23 due to rotation of the optical disk 100. Accordingly, when the tracking servo control is switched from an OFF state to an ON state, the optical disk device 101 prevents the reading of the optical disk from being interrupted before its completion.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. An optical disk device comprising:
   a pickup head for irradiating an optical disk with laser light via an objective lens and for outputting an electrical signal based on light reflected from the optical disk;
   a generation means which generates a lens error signal based on the electrical signal output from the pickup head, and after amplifying the lens error signal with a gain which is set in advance, outputs the lens error signal;
   a shifting means which shifts the objective lens in a radial direction of the optical disk;
   a LC servo means which performs a lens center servo control in which, based on the lens error signal output from the generation means, the LC servo means applies driving voltage to the shifting means and makes the objective lens follow a central position corresponding to a standard voltage; and a measurement means which, before the LC servo means applies driving voltage to the shifting means, measures a first amplitude value of the lens error signal output from the generation means by applying to the shifting means a positive predetermined level of driving voltage, and measures a second amplitude value of the lens error signal output from the generation means by applying to the shifting means a negative predetermined level of driving voltage, wherein the measurement means calculates a current gain based on the first and the second amplitude values, a latest gain which is currently set, and a predetermined target amplitude value, and then sets the current gain to the generation means, wherein after amplifying the generated lens error signal with the current gain which has been set, the generation means outputs the generated lens error signal, and wherein the LC servo means performs the lens center servo control, based on the lens error signal which has been amplified with the current gain.

2. The optical disk device according to claim 1, wherein when the first amplitude value is A1,
the second amplitude value is A2,
the target amplitude value is B,
the latest gain is P, and
the current gain is Q,
the measurement means calculates the current gain Q by using the following expression:

$$Q = P \times B/(A1-A2) \text{ if } A1 \text{ is not equal to } A2.$$

3. The optical disk device according to claim 1, wherein the measurement means measures the first and the second amplitude values, and sets the current gain to the generation means when the optical disk is set in the optical disk device or when the optical disk device with the optical disk set in the optical disk device is turned on.

4. The optical disk device according to claim 1 further comprising a tracking servo means which performs tracking servo control based on the electrical signal output from the pickup head while the LC servo means turns off the lens center servo control, wherein the tracking servo means turns off the tracking servo control while the LC servo means turns on the lens center servo control.

* * * * *